US012564120B2

(12) United States Patent
Johnson et al.

(10) Patent No.: US 12,564,120 B2
(45) Date of Patent: Mar. 3, 2026

(54) SYSTEM AND METHOD FOR CONTROLLING ROW CLEANER OPERATION ON A SEED-PLANTING IMPLEMENT

(71) Applicant: CNH Industrial America LLC, Racine, WI (US)

(72) Inventors: Chad M. Johnson, Arlington Heights, IL (US); Trevor Stanhope, Oak Lawn, IL (US); Michael Christopher Conboy, Chicago, IL (US)

(73) Assignee: CNH Industrial America LLC, New Holland, PA (US)

( * ) Notice: Subject to any disclaimer, the term of this patent is extended or adjusted under 35 U.S.C. 154(b) by 883 days.

(21) Appl. No.: 17/737,319

(22) Filed: May 5, 2022

(65) Prior Publication Data

US 2023/0354732 A1     Nov. 9, 2023

(51) Int. Cl.
*A01B 63/00*          (2006.01)
*A01C 5/06*           (2006.01)

(52) U.S. Cl.
CPC ............ *A01B 63/008* (2013.01); *A01C 5/064* (2013.01); *A01C 5/066* (2013.01)

(58) Field of Classification Search
CPC ..... A01B 63/008; A01B 63/002; A01B 63/00; A01C 5/064; A01C 5/062; A01C 5/06; A01C 5/00; A01C 5/066
See application file for complete search history.

(56) References Cited

U.S. PATENT DOCUMENTS

| | | |
|---|---|---|
| 3,170,379 A | 2/1965 | Dempster |
| 4,542,913 A | 9/1985 | Giesmann |
| 9,226,440 B2 | 1/2016 | Bassett |
| 9,307,689 B2 | 4/2016 | Adams et al. |
| 10,309,427 B2 | 6/2019 | Sauder et al. |
| 10,512,202 B2 | 12/2019 | Adams et al. |

(Continued)

FOREIGN PATENT DOCUMENTS

| | | |
|---|---|---|
| EP | 2404493 | 1/2012 |

OTHER PUBLICATIONS

Yetter Farm Equipment, "2940 Hydraulic Air Adjust Residue Manager," Operator's Manual Part Identification, 2656-779_Rev_C, Feb. 2015, Yetter Manufacturing Co. (108 pages) https://www.yetterco.com/media-library/documents/PRODUCT-RESOURCES/MANUALS-AND-INSTRUCTIONS/1462196663.pdf.

*Primary Examiner* — Christopher J. Novosad
(74) *Attorney, Agent, or Firm* — Dority & Manning, P.A.

(57)          ABSTRACT

A seed-planting implement includes a fluid-driven actuator coupled between a row unit frame and a row cleaner arm such that the actuator is configured to adjust a force being applied to the arm. The actuator, in turn, includes a cylinder and a piston moveable relative to the cylinder, with the cylinder and the piston collectively defining a lift chamber and a down chamber within the actuator. A first valve or pressure regulator is configured to control the flow of fluid into the lift chamber such that the fluid within the lift chamber is maintained at a first non-zero pressure value during a seed-planting operation. A computing system is configured to determine a second pressure value to which the down chamber is to be pressurized and control the operation of a second valve such that the fluid within the down chamber is pressurized to the second value during the seed-planting operation.

17 Claims, 6 Drawing Sheets

(56) References Cited

U.S. PATENT DOCUMENTS

| 10,631,452 | B2 | 4/2020 | Fay, II |
| 10,681,865 | B2 | 6/2020 | Dunn et al. |
| 2008/0093093 | A1 | 4/2008 | Sheppard et al. |
| 2022/0030757 | A1* | 2/2022 | Herrmann ............. F15B 13/044 |

* cited by examiner

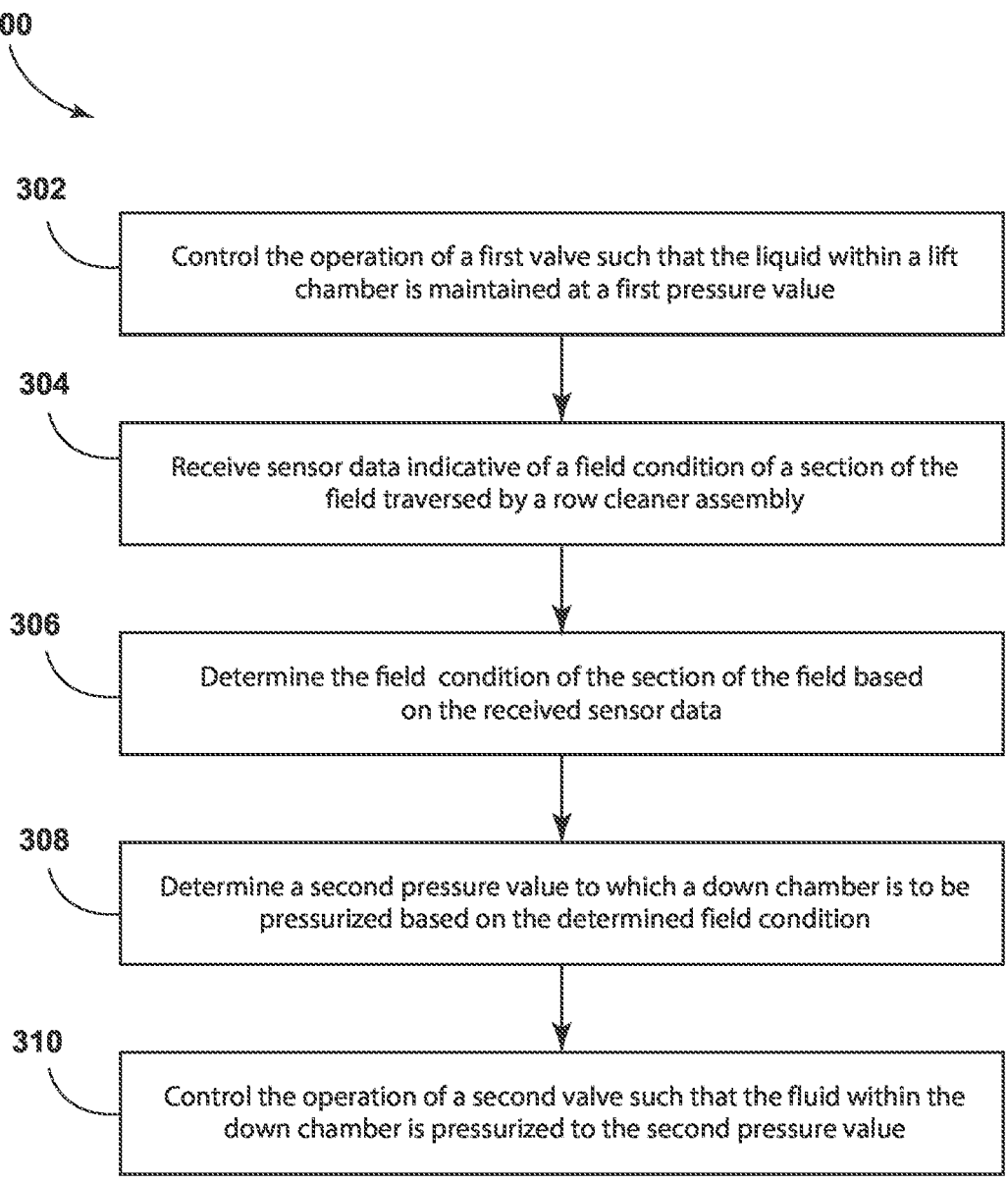

300

302

Control the operation of a first valve such that the liquid within a lift chamber is maintained at a first pressure value

304

Receive sensor data indicative of a field condition of a section of the field traversed by a row cleaner assembly

306

Determine the field condition of the section of the field based on the received sensor data

308

Determine a second pressure value to which a down chamber is to be pressurized based on the determined field condition

310

Control the operation of a second valve such that the fluid within the down chamber is pressurized to the second pressure value

FIG. 5

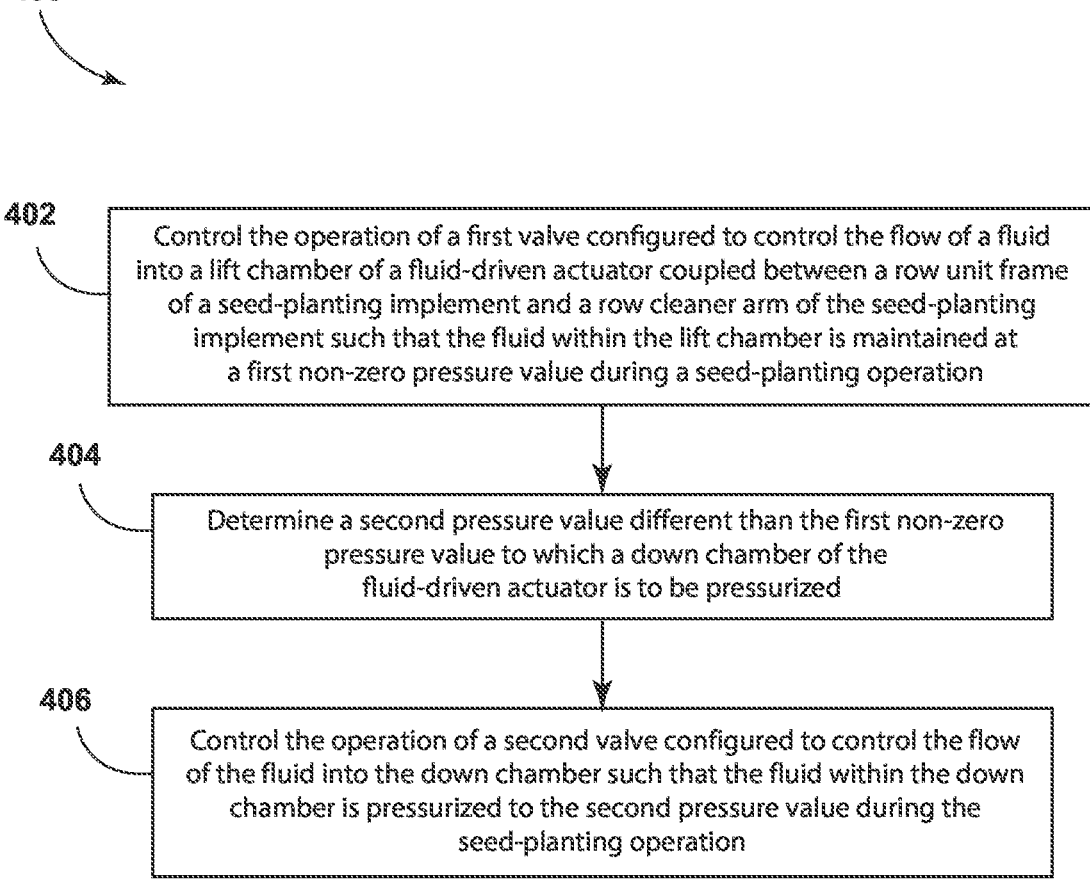

400

402

Control the operation of a first valve configured to control the flow of a fluid into a lift chamber of a fluid-driven actuator coupled between a row unit frame of a seed-planting implement and a row cleaner arm of the seed-planting implement such that the fluid within the lift chamber is maintained at a first non-zero pressure value during a seed-planting operation

404

Determine a second pressure value different than the first non-zero pressure value to which a down chamber of the fluid-driven actuator is to be pressurized

406

Control the operation of a second valve configured to control the flow of the fluid into the down chamber such that the fluid within the down chamber is pressurized to the second pressure value during the seed-planting operation

FIG. 6

SYSTEM AND METHOD FOR CONTROLLING ROW CLEANER OPERATION ON A SEED-PLANTING IMPLEMENT

FIELD OF THE INVENTION

The present disclosure generally relates to seed-planting implements and, more particularly, to systems and methods for controlling row cleaner operation on a seed-planting implement.

BACKGROUND OF THE INVENTION

Modern farming practices strive to increase yields of agricultural fields. In this respect, seed-planting implements are towed behind a tractor or other work vehicle to disperse seed throughout a field. For example, many seed-planting implements include several laterally spaced apart row units, with each row unit forming a row of planted seeds within the field. In this respect, each row unit typically includes a furrow opening assembly (e.g., a disk opener(s)) that forms a furrow or trench in the soil. Furthermore, each row unit generally includes a seed-dispensing device (e.g., a seed meter and associated seed tube) that deposits the seeds into the furrow. After deposition of the seeds, a furrow closing assembly (e.g., a pair of closing disks or wheels) may close the furrow in the soil.

In certain configurations, each row unit may include a row cleaner assembly positioned forward of the furrow opening assembly. In general, the row cleaner assembly is configured to break up and sweep away residue, dirt clods, trash, and other debris present within the path of the row unit. In this respect, the positioning of the row cleaner assembly relative to the frame of the row unit may affect the aggressiveness which the row cleaner sweeps away the debris. As such, systems for controlling the operation of the row cleaner assembly have been developed. While such systems work well, further improvements are needed.

Accordingly, an improved system and method for controlling row cleaner operation on a seed-planting implement would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a seed-planting implement including a toolbar and a plurality of row units supported on the toolbar. Each row unit includes a frame and a row cleaner assembly having a row cleaner arm pivotably coupled to the frame or the toolbar and a row cleaner wheel rotatably coupled to the row cleaner arm such that the row cleaner wheel is configured to roll relative to the field. Furthermore, each row unit includes a fluid-driven actuator coupled between the frame and the row cleaner arm such that the fluid-driven actuator is configured to adjust a pressure being applied to the row cleaner arm. In this respect, the fluid-driven actuator includes a cylinder and a piston moveable relative to the cylinder, with the cylinder and the piston collectively defining a lift chamber and a down chamber within the fluid-driven actuator. Additionally, each row unit includes a first valve or pressure regulator configured to control a flow of a fluid into the lift chamber such that the fluid within the lift chamber is maintained at a first non-zero pressure value during a seed-planting operation. Furthermore, each row unit includes a second valve configured to control a flow of the fluid into the down chamber. Moreover, the seed-planting implement includes a computing system configured to determine a second pressure value different than the first non-zero pressure value to which the down chamber is to be pressurized and control an operation of the second valve such that the fluid within the down chamber is pressurized to the second pressure value during the seed-planting operation.

In another aspect, the present subject matter is directed to a system for controlling row cleaner operation on a seed-planting implement. The system includes a row unit frame and a row cleaner assembly having a row cleaner arm pivotably coupled to the row unit frame or a toolbar of the seed-planting implement and a row cleaner wheel rotatably coupled to the row cleaner arm such that the row cleaner wheel is configured to roll relative to the field. Furthermore, the system includes a fluid-driven actuator coupled between the row unit frame and the row cleaner arm such that the fluid-driven actuator is configured to adjust a force being applied to the row cleaner arm. In this respect, the fluid-driven actuator includes a cylinder and a piston moveable relative to the cylinder, with the cylinder and the piston collectively defining a lift chamber and a down chamber within the fluid-driven actuator. Additionally, the system includes a first valve or pressure regulator configured to control a flow of a fluid into the lift chamber such that the fluid within the lift chamber is maintained at a first non-zero pressure value during a seed-planting operation. Furthermore, the system includes a second valve configured to control a flow of the fluid into the down chamber. Moreover, the system includes a computing system configured to determine a second pressure value different than the first non-zero pressure value to which the down chamber is to be pressurized and control an operation of the second valve such that the fluid within the down chamber is pressurized to the second pressure value during the seed-planting operation.

In a further aspect, the present subject matter is directed to a method for controlling row cleaner operation on a seed-planting implement. The seed-planting implement, in turn, includes a fluid-driven actuator coupled between a row unit frame of the seed-planting implement and a row cleaner arm of the seed-planting implement. In this respect, the fluid-driven actuator includes a cylinder and a piston moveable relative to the cylinder, with the cylinder and the piston collectively defining a lift chamber and a down chamber within the fluid-driven actuator. The method includes controlling, with a computing system, an operation of the first valve configured to control a flow of a fluid into the lift chamber such that the fluid within the lift chamber is maintained at a first non-zero pressure value during a seed-planting operation. Furthermore, the method includes determining, with the computing system, a second pressure value different than the first non-zero pressure value to which the down chamber is to be pressurized. Additionally, the method includes controlling, with a computing system, an operation of a second valve configured to control a flow of the fluid into the down chamber such that the fluid within the down chamber is pressurized to the second pressure value during the seed-planting operation.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 5 illustrates a flow diagram providing one embodiment of control logic for controlling row cleaner positioning on a seed-planting implement in accordance with aspects of the present subject matter; and FIG. 6 illustrates a flow diagram of one embodiment of a method for controlling row cleaner positioning on a seed-planting implement in accordance with aspects of the present subject matter.

Figure 1:
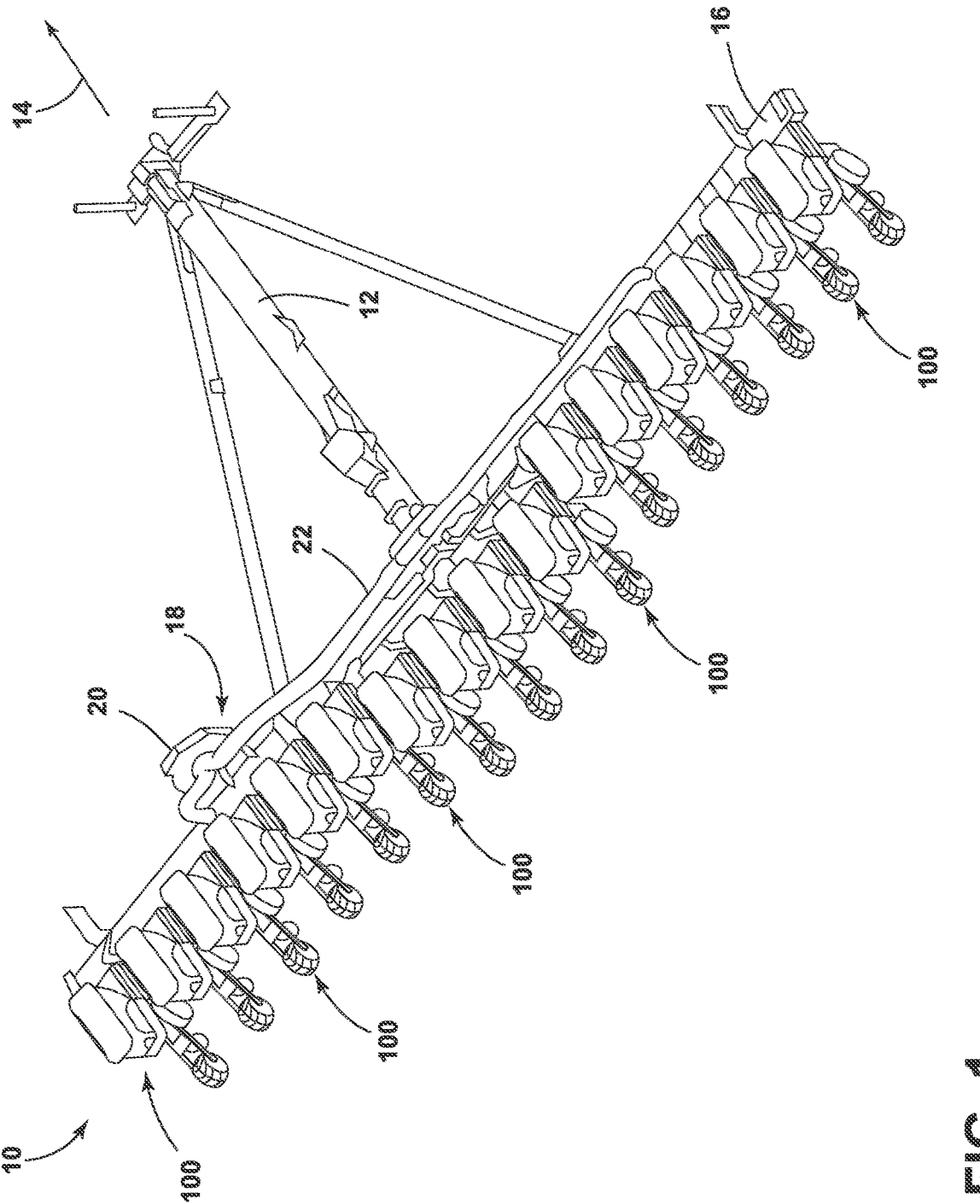
FIG. 1 illustrates a perspective view of one embodiment of a seed-planting implement in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and a method for controlling row cleaner operation on a seed-planting implement. As will be described below, the seed-planting implement includes one or more row units, with each row unit configured to plant a row of seeds within a field across which the implement is traveling. In this respect, each row unit includes a row cleaner assembly configured to break up and sweep away residue, dirt clods, trash, and other debris present within the path of the row unit. Specifically, the row cleaner assembly includes a row cleaner arm pivotably coupled to the row unit frame. Additionally, the row cleaner assembly includes a row cleaner wheel rotatably coupled to the row cleaner arm such that the row cleaner wheel is configured to roll relative to the field, thereby sweeping away debris.

Furthermore, each row unit may include a fluid-driven actuator (e.g., a pneumatic cylinder) coupled between the row unit frame and the row cleaner arm. As such, the fluid-driven actuator(s) is configured to adjust the force(s) acting on the row cleaner arm(s), thereby moving the row cleaner wheel(s) relative to the row unit frame(s) and the soil surface of the field. More specifically, each fluid-driven actuator includes a cylinder and a piston moveable relative to the cylinder. In this respect, each cylinder and corresponding piston collectively defining a lift chamber and a down chamber within the corresponding fluid-driven actuator. Additionally, a first valve(s) or pressure regulator(s) is configured to control the flow of fluid into the lift chamber(s) such that the fluid within the lift chamber(s) is maintained at a first non-zero pressure value during the performance of a seed-planting operation. The first non-zero pressure value may generally be constant during the seed-planting operation. In one embodiment, the first non-zero pressure value is sufficient to lift the row cleaner wheel(s) off of a field surface of the field when no gauge pressure is applied to the down chamber(s). Similarly, a second valve(s) configured to control the flow of fluid into the down chamber(s).

In several embodiments, a computing system of the disclosed system is configured to control the first and second valves to control the operation of the row cleaner assembly(ies). More specifically, the computing system may determine a second pressure value(s) different than the first non-zero pressure value to which the down chamber(s) is to be pressurized. The determined second pressure value(s) may maintain a target amount of engagement between the row cleaner wheel(s) and the field surface (e.g., a target amount of surface penetration or a target amount of surface pressure). For example, the determined second pressure value(s) may be based on a field condition(s) (e.g., soil hardness, soil moisture, residue coverage, etc.) of a section(s) of the field forward of the row cleaner assembly(ies). As such, the second pressure value(s) may vary during the seed-planting operation. Thereafter, the computing system may control the operation of the second valve(s) such that the fluid within the down chamber(s) is pressurized to the second pressure value(s).

Controlling the operation of a fluid-driven actuator configured to adjust the force acting on a row cleaner assembly such that its lift chamber is pressurized at a fixed first non-zero pressure value and its down chamber is pressurized at a variable second pressure value improves the operation of the seed-planting implement. More specifically, controlling such a fluid-driven actuator by applying a non-zero pressure to only one of the lift or down chambers at a time causes a non-linear response in the relationship between pressure and force applied when the system needs to switch from down force to up force or vice versa. This is due to the lift chamber and down chambers having different cross-sectional areas. Applying a given pressure to either side produces a different level of force, complicating the control operation. However, with the disclosed system and method, the lift chamber is pressurized to a fixed value and only the down chamber pressure is variably controlled. Since the computing system only needs to change the pressure in the down chamber, which has a fixed cross-sectional area, the relationship between the pressure in the down chamber and the down force applied to the row cleaner arm is linear."

Furthermore, pressurizing both of the lift and down chambers to non-zero values provides damping to the row cleaner assembly when it encounters bumps, divots, or other field impediments. Additionally, due to the weight of the row cleaner assembly, pressurizing both of the lift and down chambers to non-zero values allows the row cleaner wheel to be lifted quickly, such as when encountering an overlap zone.

Referring now to the drawings, FIG. 1 illustrates a perspective view of one embodiment of a seed-planting implement 10. In the illustrated embodiment, the seed-planting implement 10 is configured as a planter. However, in alternative embodiments, the seed-planting implement 10 may generally correspond to any suitable seed-planting equipment or implement, such as seeder or another seed-dispensing implement.

As shown in FIG. 1, the seed-planting implement 10 includes a tow bar 12. In general, the tow bar 12 is configured to couple to a tractor or other agricultural vehicle (not shown), such as via a suitable hitch assembly (not shown). In this respect, the tractor may tow the seed-planting implement 10 across a field in a direction of travel (indicated by arrow 14) to perform a seed-planting operation on the field.

Furthermore, the seed-planting implement 10 includes a toolbar 16 coupled to the aft end of the tow bar 12. More specifically, the toolbar 16 is configured to support and/or couple to one or more components of the seed-planting implement 10. For example, the toolbar 16 is configured to support one or more seed-planting units or row units 100. As will be described below, each row unit 100 is configured to form a furrow having a selected depth within the soil of the field. Thereafter, each row unit 100 deposit seeds within the corresponding furrow and subsequently closes the corresponding furrow after the seeds have been deposited, thereby establishing rows of planted seeds.

In general, the seed-planting implement 10 may include any number of row units 100. For example, in the illustrated embodiment, the seed-planting implement 10 includes sixteen row units 100 coupled to the toolbar 16. However, in other embodiments, the seed-planting implement 10 may include six, eight, twelve, twenty-four, thirty-two, or thirty-six row units 100.

Additionally, in some embodiments, the seed-planting implement 10 includes a vacuum system 18. In general, the vacuum system 18 is configured to supply vacuum pressure to the individual row units 100. As such, the vacuum system 18 may include a fan or other pressurized air source 20 and a plurality of vacuum conduits 22 extending between the fan 20 and the row units 100. In this respect, the pressurized air generated by the fan 20 may be used to pick up seeds onto the seed meters (not shown) of the individual row units 100. However, the seeds may be provided to the row units 100 in any other suitable manner.

Figure 2:
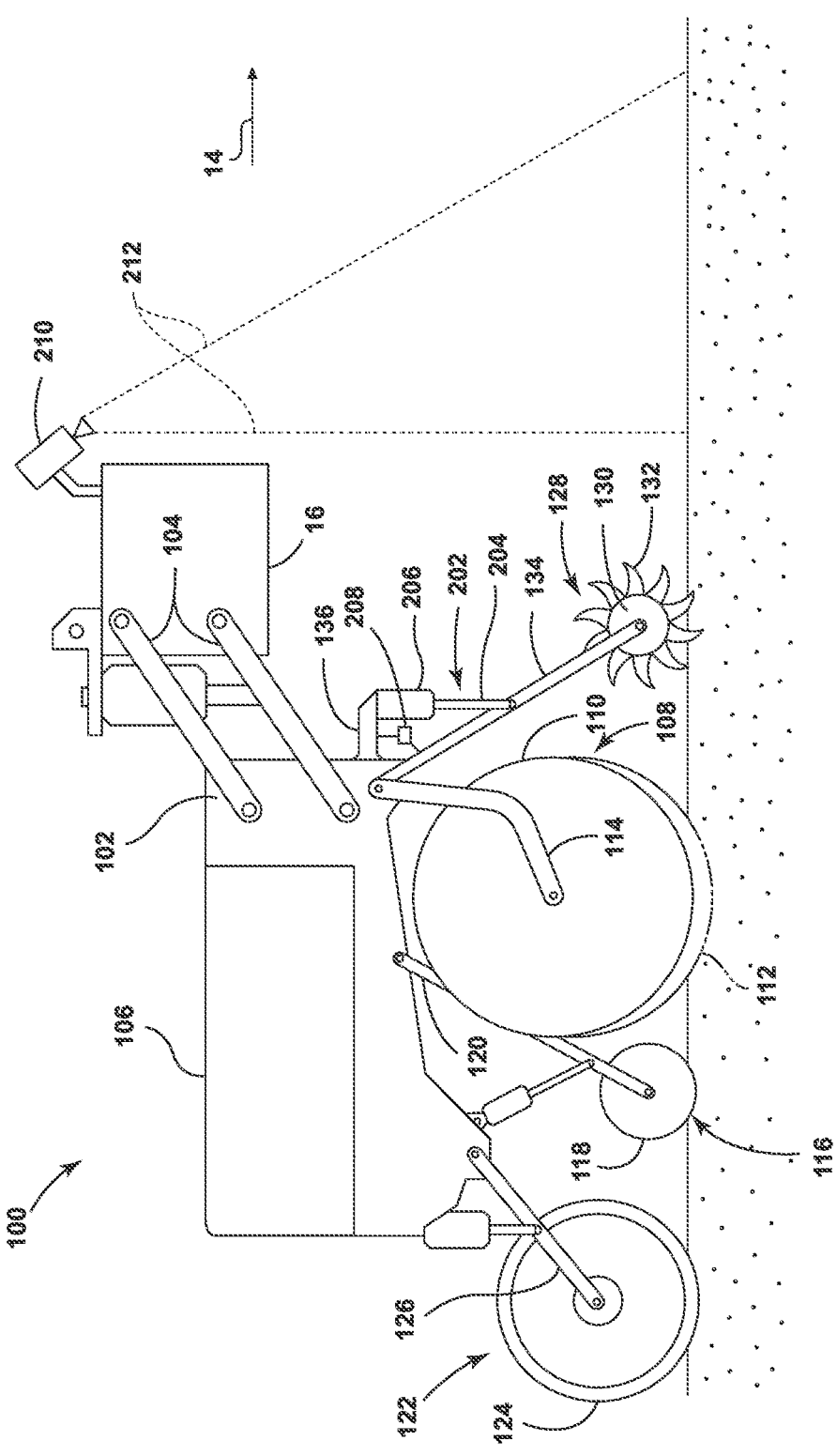
FIG. 2 illustrates a side view of one embodiment of a row unit of a seed-planting implement in accordance with aspects of the present subject matter.

FIG. 2 illustrates a side view of one embodiment of a row unit 100 of the seed-planting implement 10. As shown, the row unit 100 includes a row unit frame 102 adjustably coupled to the toolbar 16 by links 104. For example, one end of each link 104 may be pivotally coupled to the row unit frame 102, while the opposed end of each link 104 may be pivotally coupled to the toolbar 16. However, in alternative embodiments, the row unit 100 may be coupled to the toolbar 16 in any other suitable manner. Furthermore, a hopper 106 may be coupled to or otherwise supported on the row unit frame 102 and configured to store seeds (e.g., that are received from a bulk storage tank via the pneumatic distribution system 18). In addition, a seed-dispensing assembly (not shown) may be supported on the row unit frame 102 and configured to dispense seeds from the hopper 106 into the furrow being formed in the soil.

Moreover, the row unit 100 also includes a furrow opening assembly 108. For example, in one embodiment, the furrow opening assembly 108 may include a gauge wheel 110 and one or more disk openers 112 configured to excavate a furrow or trench in the soil. In general, the gauge wheel 110 is configured to engage the top surface of the soil as the implement 10 is moved across the field. As such, the height of the disk opener(s) 112 may be adjusted with respect to the position of the gauge wheel 110 to set the depth of the furrow being excavated. Furthermore, the furrow opening assembly 108 may include a support arm 114 configured to adjustably couple the gauge wheel 110 to the row unit frame 102. For example, one end of the support arm 114 may be rotatably coupled to the gauge wheel 110, while an opposed end of the support arm 114 may be pivotally coupled to the row unit frame 102. Additionally, the disk opener(s) 112 may be rotatably coupled (e.g., bolted) to the row unit frame 102. However, in alternative embodiments, the gauge wheel 110 and the disk opener(s) 112 may be coupled to the row unit frame 102 in any other suitable manner.

Moreover, the row unit 100 may include a furrow closing assembly 116. Specifically, in several embodiments, the furrow closing assembly 116 may include a pair of closing disks 118 (only one of which is shown) positioned relative to each other to permit soil to flow between the disks 118 as the implement 10 travels across the field. In this regard, the closing disks 118 are configured to close the furrow after seeds have been deposited therein, such as by collapsing the excavated soil into the furrow. Furthermore, the furrow closing assembly 116 may include a support arm 120 configured to adjustably couple the closing disks 118 to the row unit frame 102. For example, one end of the support arm 120 may be rotatably coupled to the closing disks 118, while the opposed end of the support arm 52 may be pivotally coupled to the row unit frame 102. However, in alternative embodiments, the closing disks 118 may be coupled to the row unit frame 102 in any other suitable manner. Moreover, in alternative embodiments, the furrow closing assembly 116 may include any other suitable components for closing the furrow, such as a pair of closing wheels (not shown).

Additionally, the row unit 100 may include a press wheel assembly 122. Specifically, in several embodiments, the press wheel assembly 122 may include a press wheel 124 configured to roll over the closed furrow to firm the soil over the seed and promote favorable seed-to-soil contact. Furthermore, the press wheel assembly 122 may include a support arm 126 configured to adjustably couple the press wheel 124 to the row unit frame 102. For example, one end of the support arm 126 may be rotatably coupled to the press wheel 124, while the opposed end of the support arm 126 may be pivotally coupled to the row unit frame 102. However, in alternative embodiments, the press wheel 124 may be coupled to the row unit frame 102 in any other suitable manner. Moreover, in some embodiments, the row unit 100 may not include the press wheel assembly 122.

Furthermore, the row unit 100 includes a row cleaner assembly 128 positioned forward of the disk opener(s) 112 relative to the direction of travel 14. In this regard, the row cleaner assembly 128 may be configured to break up and/or sweep away residue, dirt clods, trash, and/or other debris from path of the row unit 100 before the furrow is formed in the soil. For example, in one embodiment, the row cleaner assembly 128 may include one or more row cleaner wheels 130, with each wheel 130 having a plurality of tillage points or fingers 132. As such, the row cleaner wheel(s) 130 may be positioned relative to the soil surface such that the wheel(s) 130 roll relative to the field as the implement 10 travels across the field, thereby allowing the fingers 132 to break up and/or sweep away residue, dirt clods, trash, and/or other debris. Additionally, the row cleaner assembly 128 may include a row cleaner arm 134 configured to adjustably couple the row cleaner wheel(s) 130 to the row unit frame 102. For example, one end of the row cleaner arm 134 may be rotatably coupled to the row cleaner wheel(s) 130, while an opposed end of the row cleaner arm 134 may be pivotably coupled to the row unit frame 102.

In several embodiments, a fluid-driven actuator 202 may be configured to adjust the force acting on or otherwise move the position of the row cleaner assembly 128 relative to the row unit frame 102. Specifically, the actuator 202 is coupled between the row cleaner arm 134 and a row cleaner bracket 136, which is, in turn, coupled to the row unit frame 102. As will be described below, the rod 204 of the actuator 202 may be configured to extend and/or retract relative to the cylinder 206 to adjust the position of the row cleaner assembly 128 relative to the row unit frame 102. Moving the row cleaner assembly 128 relative to the row unit frame 102 adjusts the position of the row cleaner wheel(s) 130 relative to the soil surface of the field. Such position adjustments, in turn, adjust the amount of engagement exists between the row cleaner wheel(s) 130 and the field surface and, thus, the aggressiveness with which the wheel(s) 130 breaks up and sweeps away the debris.

Additionally, the row unit 100 may include a position sensor 208. In general, the position sensor 208 is configured to capture data indicative of the position of the row cleaner arm 134 relative to the row unit frame 102. Such position data may, in turn, be indicative of the soil hardness of the section of the field being engaged by the row cleaner assembly 128. In the illustrated embodiment, the position sensor 208 is configured as a rotary sensor coupled between the row cleaner arm 134 and the row unit frame 102 (e.g., the row cleaner bracket 136). However, in alternative embodiments, the position sensor 208 may correspond to any other suitable type of sensing device configured to capture data indicative of the position of the row cleaner arm 134 relative to the row unit frame 102.

Moreover, in several embodiments, the seed-planting implement 10 may include a residue sensor 210. In general, the residue sensor 210 is configured to capture data indicative of the residue coverage of a portion of the field (e.g., a portion of the field positioned forward of the row cleaner assembly 128 relative to the direction of travel 14). For example, in some embodiments, the residue sensor 210 may be configured as a vision-based sensor (e.g., a camera) or a transceiver-based sensor (e.g., a RADAR sensor or a LiDAR sensor) having a field of view or sensor detection zone (e.g., as indicated by dashed lines 212 in FIG. 2) directed towards a section of the field in forward of the row cleaner assembly 128 relative to the direction of travel 14.

In addition, the seed-planting implement 10 may include any suitable number of residue sensors 210. For example, in one embodiment, the seed-planting implement 10 may include only a single residue sensor 210. In another embodiment, the seed-planting implement 10 may include two residue sensors 210, with one residue sensor 210 being mounted on either side of the implement 10. Alternatively, the seed-planting implement 10 may include three or more residue sensors 210, such as one residue sensor 210 for a small group of row units 100 (e.g., for every four row units 100) or one residue sensor 210 for each row unit 100.

Figure 3:
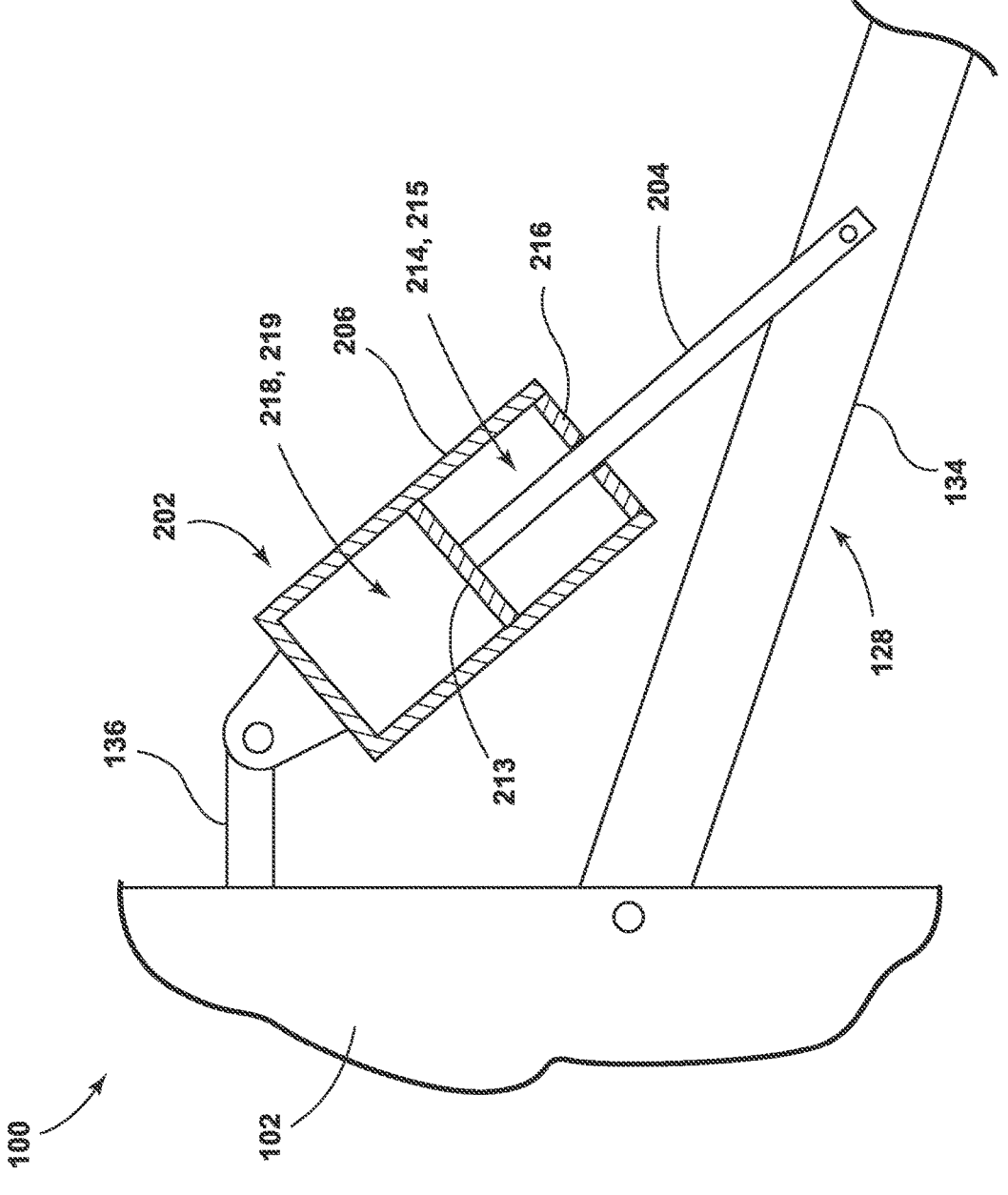
FIG. 3 illustrates a diagrammatic view of a fluid-driven actuator of a row unit of a seed-planting implement in accordance with aspects of the present subject matter.

FIG. 3 illustrates a diagrammatic view of a fluid-driven actuator 202 of the row unit 100 of the seed-planting implement 10. Specifically, in several embodiments, the actuator 202 includes a rod 204 and a cylinder 206. In the illustrated embodiment, the rod 204 is pivotably coupled to the row cleaner arm 134 and the cylinder 206 is pivotably coupled to the row cleaner bracket 136. However, in alternative embodiments, the rod 204 is pivotably coupled to the row cleaner bracket 136 and the cylinder 206 may be pivotably coupled to the row cleaner arm 134.

As shown, the actuator 202 defines a pair of fluid chambers. More specifically, the actuator 202 includes a piston 213 positioned within and moveable relative to the cylinder 206, with the rod 204 being coupled to the piston 213. In this respect, the cylinder 206 and the piston 213 collectively define a cap-side chamber 218, which corresponds to a down chamber 219 of the actuator 202. When a pressurized fluid is supplied to the down chamber 219, such fluid exerts a downward force on the row cleaner arm 134, thereby urging the row cleaner arm 134 to rotate downward (e.g., as indicated by arrow 222) such that the amount of engagement between the row cleaner wheel 130 and the soil surface increases. Moreover, the cylinder 206, the piston 213, and a gland 216 collectively define a rod-side chamber 214, which corresponds to a lift chamber 215 of the actuator 202. When a pressurized fluid is supplied to the lift chamber 215, such fluid exerts an upward or lift force on the row cleaner arm 134, thereby causing the contact force between the row cleaner wheel 132 and the soil surface to decrease.

The fluid-driven actuator 202 may be driven by any suitable fluid. For example, in some embodiments, the actuator 202 may be a pneumatic cylinder. However, in alternative embodiments, the actuator 202 may be a hydraulic cylinder.

The configuration of the seed-planting implement 10 described above and shown in FIGS. 1-3 is provided only to place the present subject matter in an exemplary field of use. Thus, the present subject matter may be readily adaptable to any manner of seed-planting implement configuration.

Figure 4:
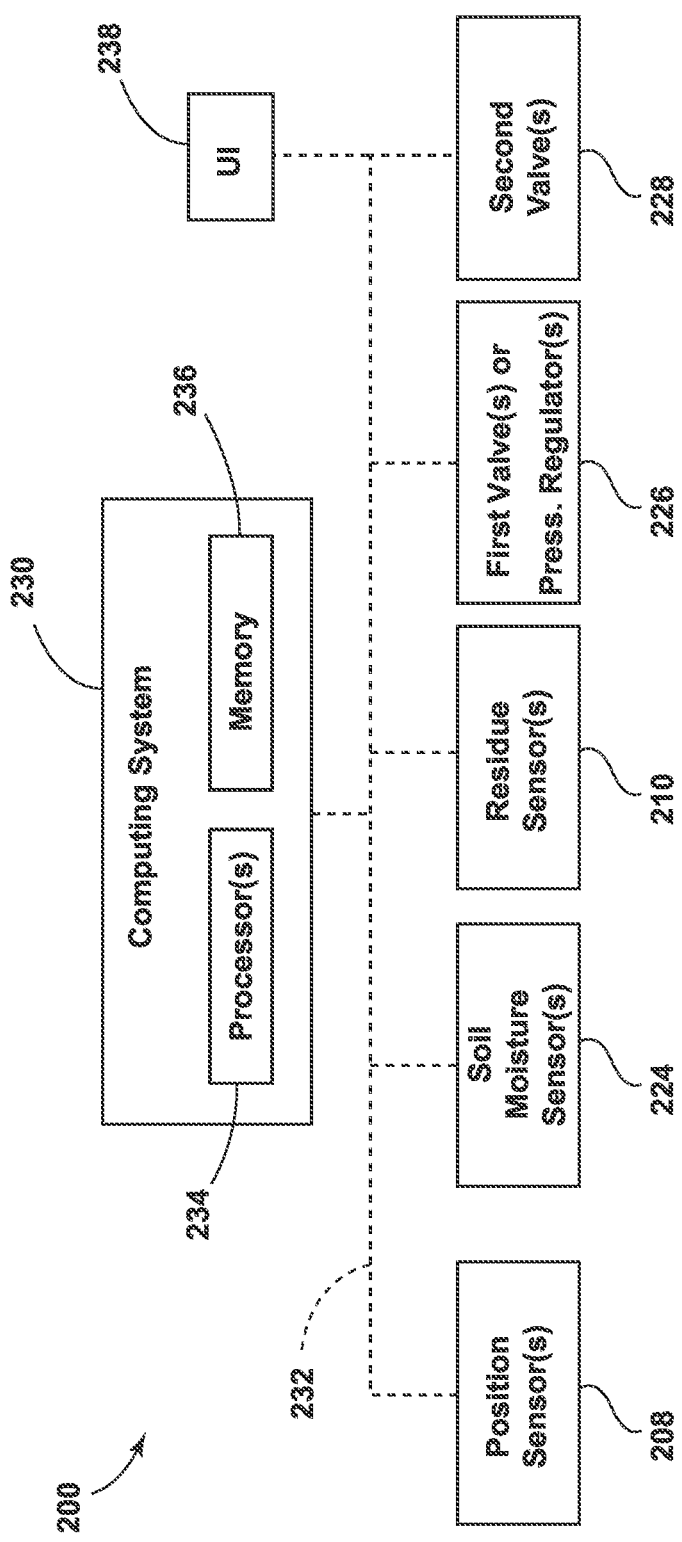
FIG. 4 illustrates a schematic view of one embodiment of a system for controlling row cleaner positioning on a seed-planting implement in accordance with aspects of the present subject matter.

Referring now to FIG. 4, a schematic view of one embodiment of a system 200 for controlling row cleaner operation on a seed-planting implement is illustrated in accordance with aspects of the present subject matter. In general, the system 200 will be described herein with reference to the seed-planting implement 10 described above with reference to FIGS. 1-3. However, the disclosed system 200 may generally be utilized with seed-planting implements having any other suitable implement configuration.

As shown, the system 200 may include one or more soil moisture sensors 224 coupled to or otherwise provided in operative association with the seed-planting implement 10. In general, the soil moisture sensor(s) 224 is configured to capture data indicative of the soil moisture content of a section(s) of the field forward of the row cleaner assembly(ies) 128 relative to the direction of travel 14 or across which the row cleaner assembly(ies) 128 is currently traveling. For example, in one embodiment, the soil moisture sensor(s) 224 may be configured as an optical sensor(s) configured to detect one or more characteristics of light reflected by the soil, with such characteristics generally being indicative of the soil moisture content. However, in alternative embodiments, the soil moisture sensor(s) 224 may be configured as any other suitable device(s) for sensing or detecting the soil moisture content of the field.

Furthermore, the system 200 includes one or more first valves or pressure regulators 226 and one or more second valves 228 positioned on the seed-planting implement 10 or an associated work vehicle, such as a tractor (not shown). More specifically, the first valve(s) or pressure regulator(s) 226 are configured to control the flow of fluid (e.g., air) into the lift chamber(s) 215 of the fluid-driven actuator(s) 202 such that the fluid within the lift chamber(s) 215 is maintained at a first non-zero pressure value during the seed-planting operation. Conversely, the second valve(s) 228 is configured to control the flow of fluid (e.g., air) into the down chamber(s) 219 of the fluid-driven actuator(s) 202. In this respect, and as will be described below, by controlling the operation of the first and second valves 226, 228, the force(s) acting on the row cleaner assembly(ies) 128 and, thus, the amount engagement between the row cleaner assembly(ies) 128 and soil surface can be controlled. In addition, the first and second valves 226, 228 may correspond to any suitable type of valves, such as needle valves, knife gate valves, pinch valves, piston valves, and/or the like.

Moreover, the system 200 includes a computing system 230 communicatively coupled to one or more components of the seed-planting implement 10 and/or the system 200 to allow the operation of such components to be electronically or automatically controlled by the computing system 230. For instance, the computing system 230 may be communicatively coupled to the sensors 208, 210, 224 via a communicative link 232. As such, the computing system 230 may be configured to receive data from the sensors 208, 210, 224 that is indicative of various parameters associated with the seed-planting implement 10 and/or the field. Furthermore, the computing system 230 may be communicatively coupled to the first valve(s) or pressure regulator(s) 226 and second valves 228 via the communicative link 232. In this respect, the computing system 230 may be configured to control the operation of the first valve(s) or pressure regulator(s) 226 and second valves 228 to move row cleaner assembly 128 relative to the row unit frame 102 and the soil surface of the field. In addition, the computing system 230 may be communicatively coupled to any other suitable components of the seed-planting implement 10 and/or the system 200.

In general, the computing system 230 may comprise one or more processor-based devices, such as a given controller or computing device or any suitable combination of controllers or computing devices. Thus, in several embodiments, the computing system 230 may include one or more processor(s) 234 and associated memory device(s) 236 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 236 of the computing system 230 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 236 may generally be configured to store suitable computer-readable instructions that, when implemented by the processor(s) 234, configure the computing system 230 to perform various computer-implemented functions, such as one or more aspects of the methods and algorithms that will be described herein. In addition, the computing system 230 may also include various other suitable components, such as a communications circuit or module, one or more input/output channels, a data/control bus and/or the like.

The various functions of the computing system 230 may be performed by a single processor-based device or may be distributed across any number of processor-based devices, in which instance such devices may be considered to form part of the computing system 230. For instance, the functions of the computing system 230 may be distributed across multiple application-specific controllers or computing devices, such as a tractor/vehicle controller, an implement controller, and/or the like.

Furthermore, the system 200 may also include a user interface 238. More specifically, the user interface 238 may be configured to receive inputs (e.g., inputs associated with the operation of the row cleaner assembly(ies) 128) from the operator. As such, the user interface 238 may include one or more input devices, such as touchscreens, keypads, touchpads, knobs, buttons, sliders, switches, mice, microphones, and/or the like, which are configured to receive inputs from the operator. The user interface 238 may, in turn, be communicatively coupled to the computing system 230 via the communicative link 232 to permit the received inputs to be transmitted from the user interface 238 to the computing system 230. In addition, some embodiments of the user interface 238 may include one or more feedback devices (not shown), such as display screens, speakers, warning lights, and/or the like, which are configured to provide feedback from the computing system 230 to the operator. In one embodiment, the user interface 238 may be mounted or otherwise positioned within the cab of a vehicle configured to tow the seed-planting implement 10 across the field in the direction of travel 14. However, in alternative embodiments, the user interface 238 may mounted at any other suitable location. In some embodiments, the user interface 238 may correspond to a remote device, such as a Smartphone, tablet, laptop, or the like.

Referring now to FIG. 5, a flow diagram of one embodiment of control logic 300 that may be executed by the computing system 230 (or any other suitable computing system) for controlling row cleaner operation on a seed-planting implement is illustrated in accordance with aspects of the present subject matter. Specifically, the control logic 300 shown in FIG. 5 is representative of steps of one embodiment of an algorithm that can be executed to control row cleaner operation on a seed-planting implement to maintain a target amount of engagement between the row cleaner wheel(s) and the soil surface as field conditions change. Thus, in several embodiments, the control logic 300 may be advantageously utilized in association with a system installed on or forming part of seed-planting implement to allow for real-time control of row cleaner operation without requiring substantial computing resources and/or processing time. However, in other embodiments, the control logic 300 may be used in association with any other suitable system, application, and/or the like for controlling row cleaner operation on a seed-planting implement.

As shown in FIG. 5, at (302), the control logic 300 includes controlling the operation of a first valve configured to control the flow of fluid into a lift chamber of a fluid-driven actuator coupled between a row unit frame and a row cleaner arm such that the fluid within the lift chamber is maintained at a first non-zero pressure value during a seed-planting operation. Specifically, as mentioned above, in several embodiments, the computing system 230 may be communicatively coupled to the first valve(s) or a pressure regulator(s) 226 via the communicative link 232. In this respect, as the seed-planting implement 10 travels across the field to perform a seed-planting operation thereon, the computing system 230 controls the operation of the first valve(s) or a pressure regulator(s) 226 such that the fluid within the lift chamber(s) 215 is maintained at a first non-zero pressure value. The first non-zero pressure value remains constant or substantially constant during seed-planting operation. In one embodiment, the first non-zero pressure value is sufficient to lift the row cleaner wheel(s)

130 off of the field surface of the field when no gauge pressure is applied to the down chamber(s) 219. Alternatively, in other embodiments, a pressure regulator(s) 226 may passively maintain the fluid within the lift chamber(s) 215 at a first non-zero pressure value Furthermore, at (304), the control logic 300 includes receiving sensor data indicative of a field condition of a section of the field positioned forward of the row cleaner assembly or a section of the field across which the row cleaner assembly is currently traveling. Specifically, as mentioned above, in several embodiments, the computing system 230 may be communicatively coupled to the one or more sensors, such as the position sensor(s) 208, the residue sensor(s) 210, and/or the soil moisture sensor(s) 224, via the communicative link 232. In this respect, as the seed-planting implement 10 travels across the field to perform the seed-planting operation, the computing system 230 may receive data from the position sensor(s) 208, the residue sensor(s) 210, and/or the soil moisture sensor(s) 224. Such data may, in turn, be indicative of the field conditions being encountered by or that will be encountered by the row cleaner assembly(ies) 128.

Additionally, at (306), the control logic 300 includes determining the field condition of the section of the field positioned forward of the row cleaner assembly based on the received sensor data. Specifically, in several embodiments, the computing system 230 is configured to determine one or more field conditions of the section of the field across which the row cleaner wheel(s) 230 is traveling or will be traveling. For example, the computing system 230 may use a suitable look up table stored within its memory device(s) 236 that correlates the received sensor data to the field condition(s).

In one embodiment, the field condition(s) may include the soil hardness of the field. As mentioned above, the computing system 230 may receive data from the position sensor(s) 208. Such data is indicative of the position(s) of the row cleaner arm(s) 134 relative to the row unit frame(s) 102, which, in turn, indicative of the soil hardness. Thus, in such an embodiment, the computing system 230 may determine the soil hardness based on the data from the position sensor(s) 208 at (304).

Furthermore, in another embodiment, the field condition(s) may include the soil moisture content of the field. As mentioned above, the computing system 230 may receive data from the soil moisture sensor(s) 224. Thus, in such an embodiment, the computing system 230 may determine the soil moisture content based on the data from the soil moisture sensor(s) 224 at (304).

Moreover, in a further embodiment, the field condition(s) may include the residue coverage of the field. As mentioned above, the computing system 230 may receive data from the residue sensor(s) 210. Thus, in such an embodiment, the computing system 230 may determine the residue coverage based on the data from the residue sensor(s) 210 at (304).

Additionally, at (308), the control logic 300 includes determining a second pressure value different than the first non-zero pressure value to which a down chamber of the fluid-driven actuator is to be pressurized. In several embodiments, the computing system 230 is configured to determine a second pressure value(s) different than the first non-zero pressure value to which the down chamber(s) 218 of the fluid-driven actuator(s) 202 is to be pressurized. The second pressure(s) value (and, more specifically, the differential between the first and second pressure values) may ensure that a target amount of engagement between the row cleaner wheel(s) 230 and the field surface exists (e.g., a target amount of surface penetration and/or a target amount of surface pressure). Specifically, the pressure of the fluid in the lift chamber(s) 215 urges the row cleaner arm(s) 134 upward, thereby reducing the engagement between the row cleaner wheel(s) 230 and the soil. Conversely, the pressure of the fluid in the down chamber(s) 219 urges the row cleaner arm(s) 134 downward, thereby increasing the engagement between the row cleaner wheel(s) 230 and the soil. Because the first non-zero pressure value is fixed, the second value(s) can be determined to apply a target downforce to the row cleaner arm(s) 134 such that the target amount of engagement between the row cleaner wheel(s) 230 and a field surface exists.

In some embodiments, at (308), the second pressure value(s) is determined based on the determined field condition(s). Specifically, in such embodiments, the computing system 230 may determine the second pressure value(s) based on the field condition(s) determined at (306) to ensure that the target amount of engagement between the row cleaner wheel(s) 230 and a field surface exists. For example, when the residue coverage determined at (308) increases, the second pressure value(s) may be increased to increase that the amount of engagement between the row cleaner wheel(s) 230 and the field surface. Conversely, when the residue coverage determined at (308) decreases, the second pressure value(s) may be reduced to decrease the amount of engagement between the row cleaner wheel(s) 230 and the field surface. Moreover, when the soil hardness determined at (308) increases, the second pressure value(s) may be increased to increase that the amount of engagement between the row cleaner wheel(s) 230 and the field surface. Conversely, when the soil hardness determined at (308) decreases, the second pressure value(s) may be reduced to decrease that the amount of engagement between the row cleaner wheel(s) 230 and the field surface. In addition, when the soil moisture determined at (308) decreases, the second pressure value(s) may be increased to increase that the amount of engagement between the row cleaner wheel(s) 230 and the field surface. Conversely, when the soil moisture content determined at (308) increases, the second pressure value(s) may be reduced to decrease that the amount of engagement between the row cleaner wheel(s) 230 and the field surface. However, in alternative embodiments, the second pressure value(s) may be determined based on any other suitable field conditions. Furthermore, in one embodiment, the computing system 230 is configured to determine the second pressure value(s) based on a received operator input (e.g., via the user interface 238).

In addition, at (310), the control logic 300 includes controlling the operation of a second valve configured to control a flow of the fluid into the down chamber such that the fluid within the down chamber is pressurized to the second pressure value during the seed-planting operation. Specifically, as mentioned above, in several embodiments, the computing system 230 may be communicatively coupled to the second valve(s) 228 via the communicative link 232. In this respect, as the seed-planting implement 10 travels across the field to perform a seed-planting operation thereon, the computing system 230 controls the operation of the second valve(s) 228 such that the fluid within the down chamber(s) 219 is pressurized to the second pressure value(s). As field conditions vary, the second pressure value(s) may vary, while first non-zero pressure value may remain constant. In this respect, upon completion of (310), the control logic 300 returns to (304).

Referring now to FIG. 6, a flow diagram of one embodiment of a method 400 for controlling row cleaner operation on a seed-planting implement is illustrated in accordance with aspects of the present subject matter. In general, the method 400 will be described herein with reference to the seed-planting implement 10 and the system 200 described above with reference to FIGS. 1-5. However, the disclosed method 400 may generally be implemented with any seed-planting implement having any suitable implement configuration and/or within any system having any suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (402), the method 400 may include controlling, with a computing system, the operation of a first valve configured to control the flow of fluid into a lift chamber of a fluid-driven actuator coupled between a row unit frame of a seed-planting implement and a row cleaner arm of the seed-planting implement such that the fluid within the lift chamber is maintained at a first non-zero pressure value during a seed-planting operation. For instance, as described above, the computing system 230 may be configured to control the operation of first valve(s) 226 such that the fluid within the lift chamber(s) 215 of the fluid-driven actuator(s) 202 coupled between the row unit frame(s) 102 and the row cleaner arm(s) 134 is maintained at a first non-zero pressure value during a seed-planting operation.

Additionally, at (404), the method 400 may include determining, with the computing system, a second pressure value different than the first non-zero pressure value to which a down chamber of the fluid-driven actuator is to be pressurized. For instance, as described above, the computing system 230 may be configured to determine a second pressure value different than the first non-zero pressure value to which down chamber(s) 219 of the fluid-driven actuator(s) 202 is to be pressurized.

Moreover, as shown in FIG. 6, at (406), the method 400 may include controlling, with a computing system, an operation of a second valve configured to control a flow of the fluid into the down chamber such that the fluid within the down chamber is pressurized to the second pressure value during the seed-planting operation. For instance, as described above, the computing system 230 may be configured to control the operation of the second valve(s) 228 configured to control the flow of fluid into the down chamber(s) 219 such that the fluid within the down chamber (s) 219 is pressurized to the second pressure value during the seed-planting operation.

It is to be understood that the steps of the control logic 300 and the method 400 are performed by the computing system 230 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 230 described herein, such as the control logic 300 and the method 400, is implemented in software code or instructions which are tangibly stored on a tangible computer readable medium. The computing system 230 loads the software code or instructions via a direct interface with the computer readable medium or via a wired and/or wireless network. Upon loading and executing such software code or instructions by the computing system 230, the computing system 230 may perform any of the functionality of the computing system 230 described herein, including any steps of the control logic 300 and the method 400 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A seed-planting implement, comprising:
    a toolbar;
    a plurality of row units supported on the toolbar, each row unit comprising:
       a frame;
       a row cleaner assembly including a row cleaner arm pivotably coupled to the frame or the toolbar and a row cleaner wheel rotatably coupled to the row cleaner arm such that the row cleaner wheel is configured to roll relative to the field; and
    a fluid-driven actuator coupled between the frame and the row cleaner arm such that the fluid-driven actuator is configured to adjust a force being applied to the row cleaner arm, the fluid-driven actuator including a cylinder and a piston moveable relative to the cylinder, the cylinder and the piston collectively defining a lift chamber and a down chamber within the fluid-driven actuator;
    a first valve or pressure regulator configured to control a flow of a fluid into the lift chamber such that the fluid within the lift chamber is maintained at a first non-zero pressure value during a seed-planting operation;
    a second valve configured to control a flow of the fluid into the down chamber;
    a sensor configured to capture data indicative of a field condition of a section of the field; and
    a computing system communicatively coupled to the sensor, the computing system configured to:
       determine the field condition of the section of the field based on the data captured by the sensor;
       determine a second pressure value different than the first non-zero pressure value to which the down chamber is to be pressurized based on the determined field condition; and control an operation of the second valve such that the fluid within the down chamber is pressurized to the second pressure value during the seed-planting operation.

2. The seed-planting implement of claim 1, wherein the first non-zero pressure value is sufficient to lift the row cleaner wheel off of a field surface of the field when no gauge pressure is applied to the down chamber.

3. The seed-planting implement of claim 1, wherein, when determining the second pressure value, the computing system is configured to determine the second pressure value such that a target amount of engagement exists between the row cleaner wheel and a field surface.

4. The seed-planting implement of claim 3, wherein the target amount of engagement between the row cleaner wheel and the field surface comprises at least one of a target amount of surface penetration or a target amount of surface pressure.

5. The seed-planting implement of claim 1, further comprising:
a disk opener rotatably coupled to the row unit frame and positioned aft of the row cleaner assembly relative to a direction of travel of the seed-planting implement, the disk opener configured to form a furrow within a field across which the seed-planting implement is traveling.

6. A system for controlling row cleaner operation on a seed-planting implement, the system comprising:
a row unit frame;
a row cleaner assembly including a row cleaner arm pivotably coupled to the row unit frame or a toolbar of the seed-planting implement and a row cleaner wheel rotatably coupled to the row cleaner arm such that the row cleaner wheel is configured to roll relative to the field; and
a fluid-driven actuator coupled between the row unit frame and the row cleaner arm such that the fluid-driven actuator is configured to adjust a force being applied to the row cleaner arm, the fluid-driven actuator including a cylinder and a piston moveable relative to the cylinder, the cylinder and the piston collectively defining a lift chamber and a down chamber within the fluid-driven actuator;
a first valve or pressure regulator configured to control a flow of a fluid into the lift chamber such that the fluid within the lift chamber is maintained at a first non-zero pressure value during a seed-planting operation;
a second valve configured to control a flow of the fluid into the down chamber;
a sensor configured to capture data indicative of a field condition of a section of the field; and
a computing system communicatively coupled to the sensor, the computing system configured to:
determine the field condition of the section of the field based on the data captured by the sensor;
determine a second pressure value different than the first non-zero pressure value to which the down chamber is to be pressurized based on the determined field condition; and
control an operation of the second valve such that the fluid within the down chamber is pressurized to the second pressure value during the seed-planting operation.

7. The system of claim 6, wherein the first non-zero pressure value is sufficient to lift the row cleaner wheel off of a field surface of the field when no gauge pressure is applied to the down chamber.

8. The system of claim 6, wherein, when determining the second pressure value, the computing system is configured to determine the second n pressure value such that a target amount of engagement exists between the row cleaner wheel and a field surface.

9. The system of claim 8, wherein the target amount of engagement between the row cleaner wheel and the field surface comprises at least one of a target amount of surface penetration or a target amount of surface pressure.

10. The system of claim 6, wherein the field condition comprises a soil hardness of the section of the field.

11. The system of claim 6, wherein the field condition comprises a soil moisture content of the section of the field.

12. The system of claim 6, wherein the field condition comprises a residue coverage of the section of the field.

13. A method for controlling row cleaner operation on a seed-planting implement, the seed-planting implement including a fluid-driven actuator coupled between a row unit frame of the seed-planting implement and a row cleaner arm of the seed-planting implement, the fluid-driven actuator including a cylinder and a piston moveable relative to the cylinder, the cylinder and the piston collectively defining a lift chamber and a down chamber within the fluid-driven actuator, the method comprising:
controlling, with a computing system, an operation of the first valve configured to control a flow of a fluid into the lift chamber such that the fluid within the lift chamber is maintained at a first non-zero pressure value during a seed-planting operation;
receiving, with the computing system, sensor data indicative of a field condition of a section of the field positioned forward of the row cleaner assembly relative to a direction of travel of the seed-planting implement;
determining, with the computing system, the field condition of the section of the field based on the data captured by the sensor;
determining, with the computing system, a second pressure value different than the first non-zero pressure value to which the down chamber is to be pressurized based on the determined field condition; and
controlling, with a computing system, an operation of a second valve configured to control a flow of the fluid into the down chamber such that the fluid within the down chamber is pressurized to the second pressure value during the seed-planting operation.

14. The method of claim 13, wherein the first non-zero pressure value is sufficient to lift the row cleaner wheel off of a field surface of the field when no gauge pressure is applied to the down chamber.

15. The method of claim 13, wherein determining the second pressure value comprises determining, with the computing system, the second pressure value such that a target amount of engagement exists between the row cleaner wheel and a field surface.

16. The method of claim 15, wherein the target amount of engagement between the row cleaner wheel and the field surface comprises at least one of a target amount of surface penetration or a target amount of surface pressure.

17. The method of claim 13, wherein the field condition comprises at least one of a soil hardness of the section of the field, a soil moisture content of the section of the field, or a residue coverage of the section of the field.

* * * * *